(12) United States Patent
Yamamoto

(10) Patent No.: US 12,720,008 B2
(45) Date of Patent: Aug. 25, 2026

(54) IMAGE CAPTURING APPARATUS, CONTROL METHOD THEREOF, RECORDING MEDIUM, AND SYSTEM

(71) Applicant: CANON KABUSHIKI KAISHA, Tokyo (JP)

(72) Inventor: Yuki Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/086,383

(22) Filed: Mar. 21, 2025

(65) Prior Publication Data

US 2025/0247495 A1 Jul. 31, 2025

Related U.S. Application Data

(63) Continuation of application No. PCT/JP2023/030286, filed on Aug. 23, 2023.

(30) Foreign Application Priority Data

Sep. 29, 2022 (JP) ................................ 2022-156461

(51) Int. Cl.
*H04N 5/77* (2006.01)
*H04N 7/025* (2006.01)
*H04N 23/661* (2023.01)

(52) U.S. Cl.
CPC ............... *H04N 5/77* (2013.01); *H04N 7/025* (2013.01); *H04N 23/661* (2023.01)

(58) Field of Classification Search
CPC ......... H04N 5/77; H04N 23/661; H04N 7/025
See application file for complete search history.

(56) References Cited

U.S. PATENT DOCUMENTS 7,460,601 B2 12/2008 Taniguchi
7,974,511 B2 7/2011 Mikawa
(Continued)

FOREIGN PATENT DOCUMENTS

JP 2003-134435 A 5/2003
JP 2004-104429 A 4/2004
(Continued)

OTHER PUBLICATIONS

PCT International Search Report and Written Opinion dated Oct. 30, 2023, in Application Patent No. PCT/JP2023/030286 (with partial English translation).

(Continued)

*Primary Examiner* — Mishawn N. Hunter
(74) *Attorney, Agent, or Firm* — VENABLE LLP

(57) ABSTRACT

An image capturing apparatus transmits, via a communication unit, moving image data obtained by image capturing to an external apparatus. The apparatus transmits, upon receiving an instruction to start recording, the moving image data to the external apparatus, ends, upon receiving an instruction to end the recording, the transmission of the moving image data, generates, upon receiving the instruction to start the recording, metadata associated with the start of the recording of the moving image data, and generates, upon receiving the instruction to end the recording, metadata associated with the end of the recording of the moving image data. The apparatus transmits, upon receiving the instruction to end the recording, metadata from the start of the recording to the end of the recording to the external apparatus.

8 Claims, 14 Drawing Sheets

(56) References Cited

U.S. PATENT DOCUMENTS

| | | | | |
|---|---|---|---|---|
| 11,284,156 | B2 | 3/2022 | Horita | |
| 11,611,805 | B2 | 3/2023 | Horita | |
| 2010/0328495 | A1* | 12/2010 | Ishii | H04N 23/667 348/231.99 |
| 2017/0048581 | A1 | 2/2017 | Kim et al. | |
| 2017/0208348 | A1 | 7/2017 | Cheng et al. | |
| 2018/0110398 | A1* | 4/2018 | Schwartz | A61B 1/0002 |
| 2020/0314336 | A1 | 10/2020 | Arifuku | |
| 2022/0417445 | A1* | 12/2022 | Tsugawa | H04N 9/8205 |

FOREIGN PATENT DOCUMENTS

| | | | |
|---|---|---|---|
| JP | 2004-363825 | A | 12/2004 |
| JP | 2010-154116 | A | 7/2010 |
| JP | 2017-163538 | A | 9/2017 |

OTHER PUBLICATIONS

European Search Report dated Jul. 10, 2026, in related European Patent Application No. 23871587.4-1207.

* cited by examiner

FIG. 2

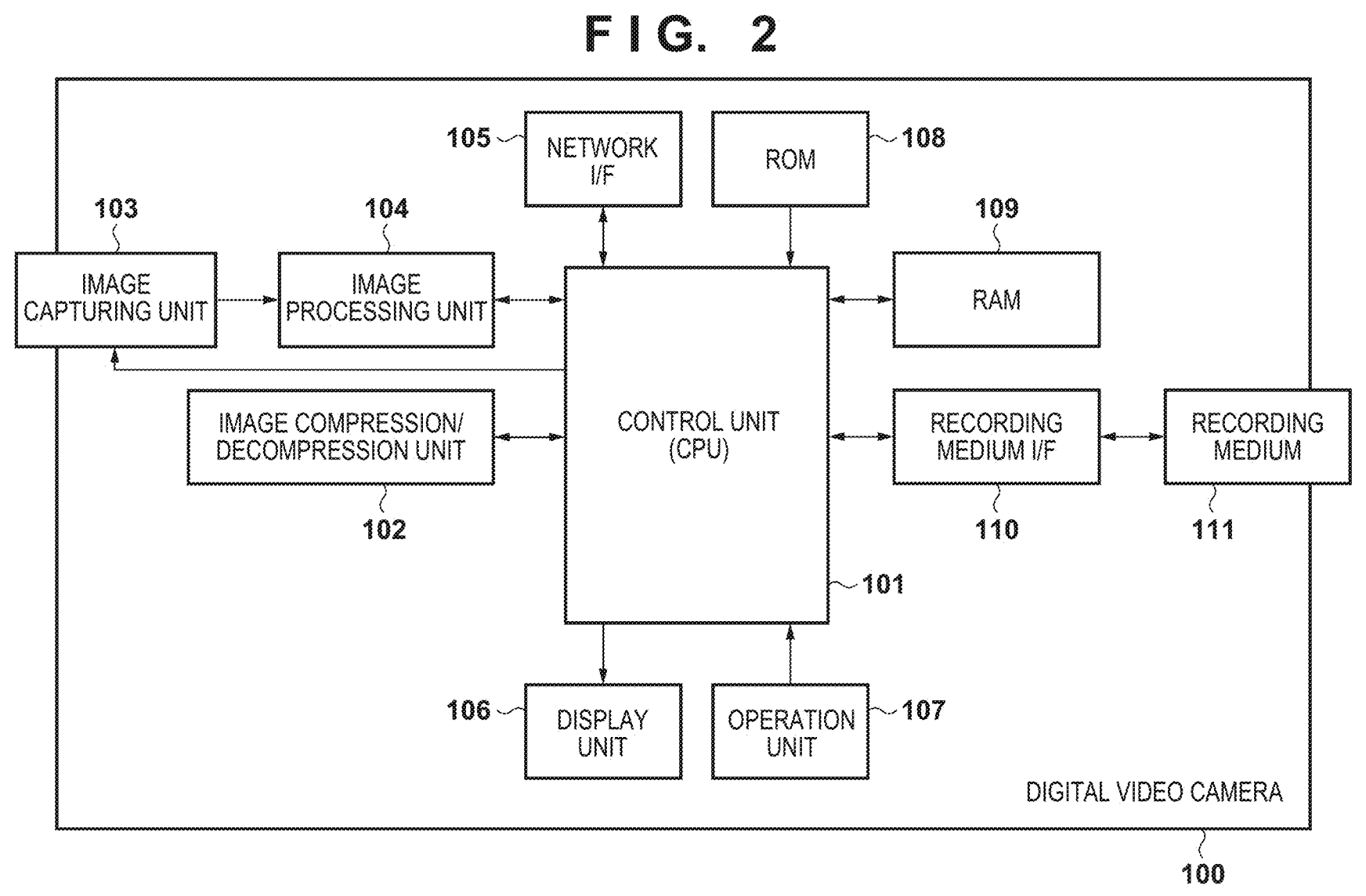

DIGITAL VIDEO CAMERA 100

CONTROL UNIT (CPU) 101

IMAGE COMPRESSION/ DECOMPRESSION UNIT 102

IMAGE CAPTURING UNIT 103

IMAGE PROCESSING UNIT 104

NETWORK I/F 105

DISPLAY UNIT 106

OPERATION UNIT 107

ROM 108

RAM 109

RECORDING MEDIUM I/F 110

RECORDING MEDIUM 111

FIG. 3

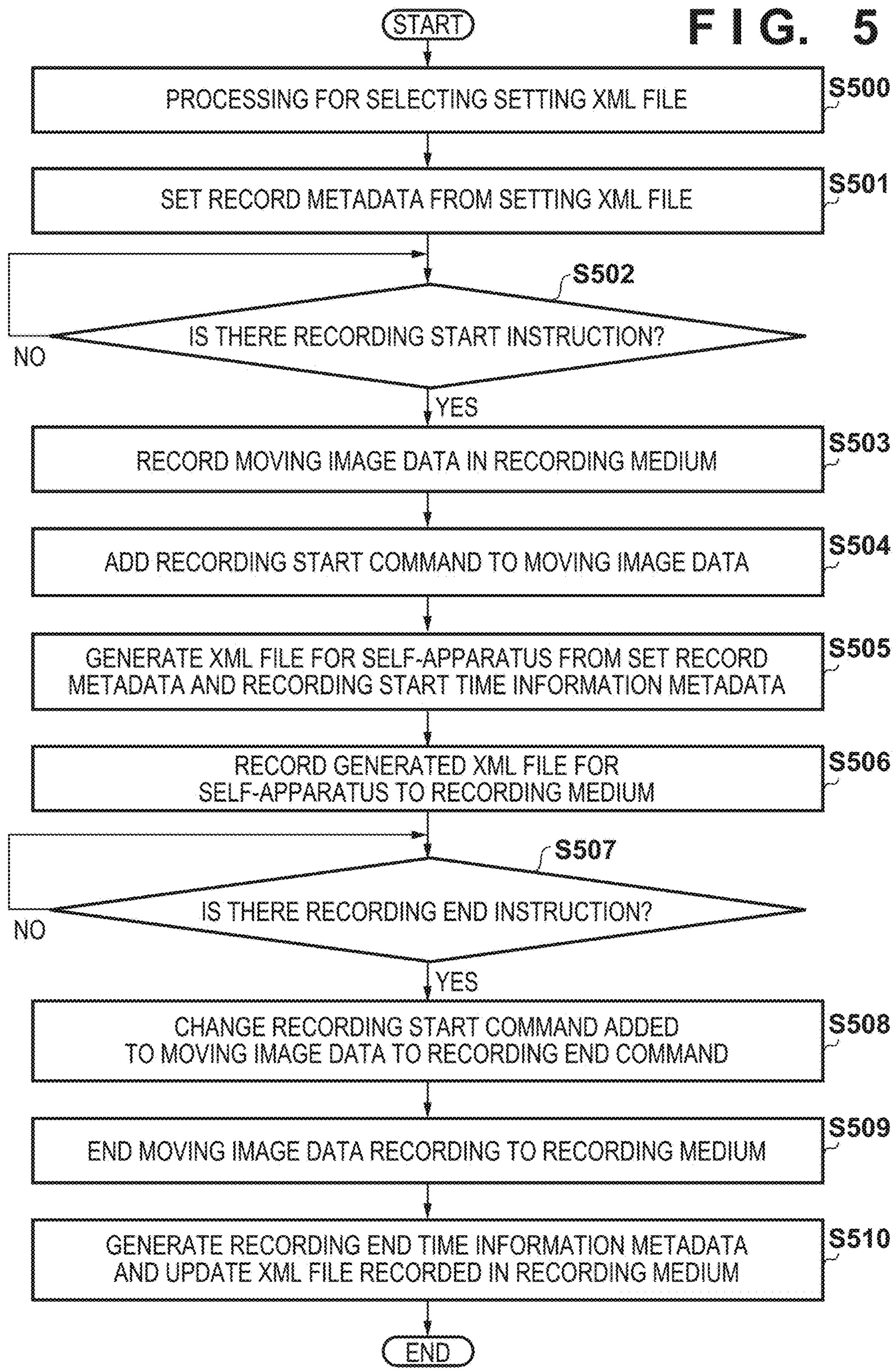
F I G. 5
START
PROCESSING FOR SELECTING SETTING XML FILE
S500
SET RECORD METADATA FROM SETTING XML FILE
S501
S502
IS THERE RECORDING START INSTRUCTION?
NO
YES
RECORD MOVING IMAGE DATA IN RECORDING MEDIUM
S503
ADD RECORDING START COMMAND TO MOVING IMAGE DATA
S504
GENERATE XML FILE FOR SELF-APPARATUS FROM SET RECORD METADATA AND RECORDING START TIME INFORMATION METADATA
S505
RECORD GENERATED XML FILE FOR SELF-APPARATUS TO RECORDING MEDIUM
S506
S507
IS THERE RECORDING END INSTRUCTION?
NO
YES
CHANGE RECORDING START COMMAND ADDED TO MOVING IMAGE DATA TO RECORDING END COMMAND
S508
END MOVING IMAGE DATA RECORDING TO RECORDING MEDIUM
S509
GENERATE RECORDING END TIME INFORMATION METADATA AND UPDATE XML FILE RECORDED IN RECORDING MEDIUM
S510
END

FIG. 7

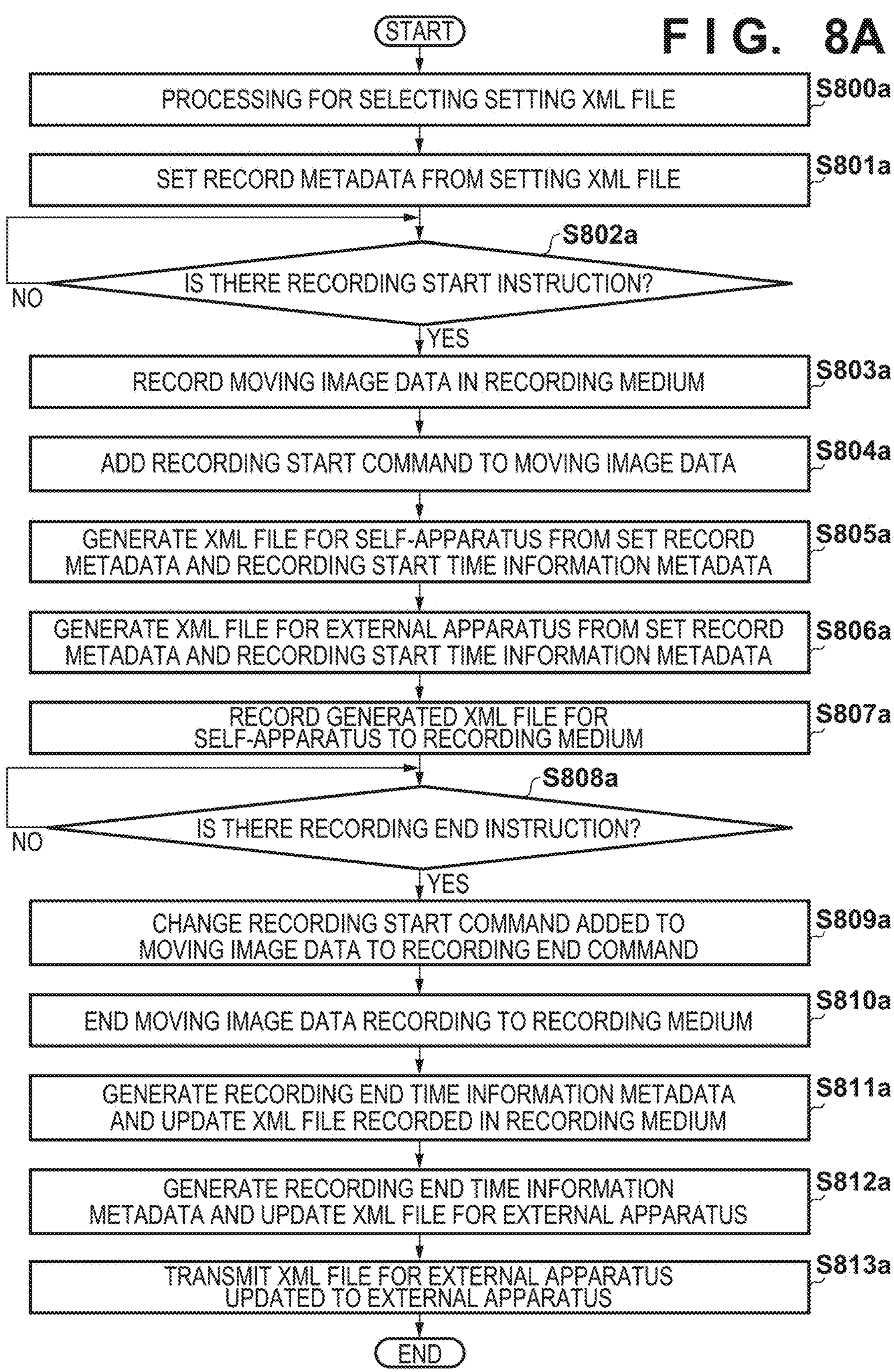

FIG. 8A
START
PROCESSING FOR SELECTING SETTING XML FILE
S800a
SET RECORD METADATA FROM SETTING XML FILE
S801a
S802a
IS THERE RECORDING START INSTRUCTION?
NO
YES
RECORD MOVING IMAGE DATA IN RECORDING MEDIUM
S803a
ADD RECORDING START COMMAND TO MOVING IMAGE DATA
S804a
GENERATE XML FILE FOR SELF-APPARATUS FROM SET RECORD METADATA AND RECORDING START TIME INFORMATION METADATA
S805a
GENERATE XML FILE FOR EXTERNAL APPARATUS FROM SET RECORD METADATA AND RECORDING START TIME INFORMATION METADATA
S806a
RECORD GENERATED XML FILE FOR SELF-APPARATUS TO RECORDING MEDIUM
S807a
S808a
IS THERE RECORDING END INSTRUCTION?
NO
YES
CHANGE RECORDING START COMMAND ADDED TO MOVING IMAGE DATA TO RECORDING END COMMAND
S809a
END MOVING IMAGE DATA RECORDING TO RECORDING MEDIUM
S810a
GENERATE RECORDING END TIME INFORMATION METADATA AND UPDATE XML FILE RECORDED IN RECORDING MEDIUM
S811a
GENERATE RECORDING END TIME INFORMATION METADATA AND UPDATE XML FILE FOR EXTERNAL APPARATUS
S812a
TRANSMIT XML FILE FOR EXTERNAL APPARATUS UPDATED TO EXTERNAL APPARATUS
S813a
END

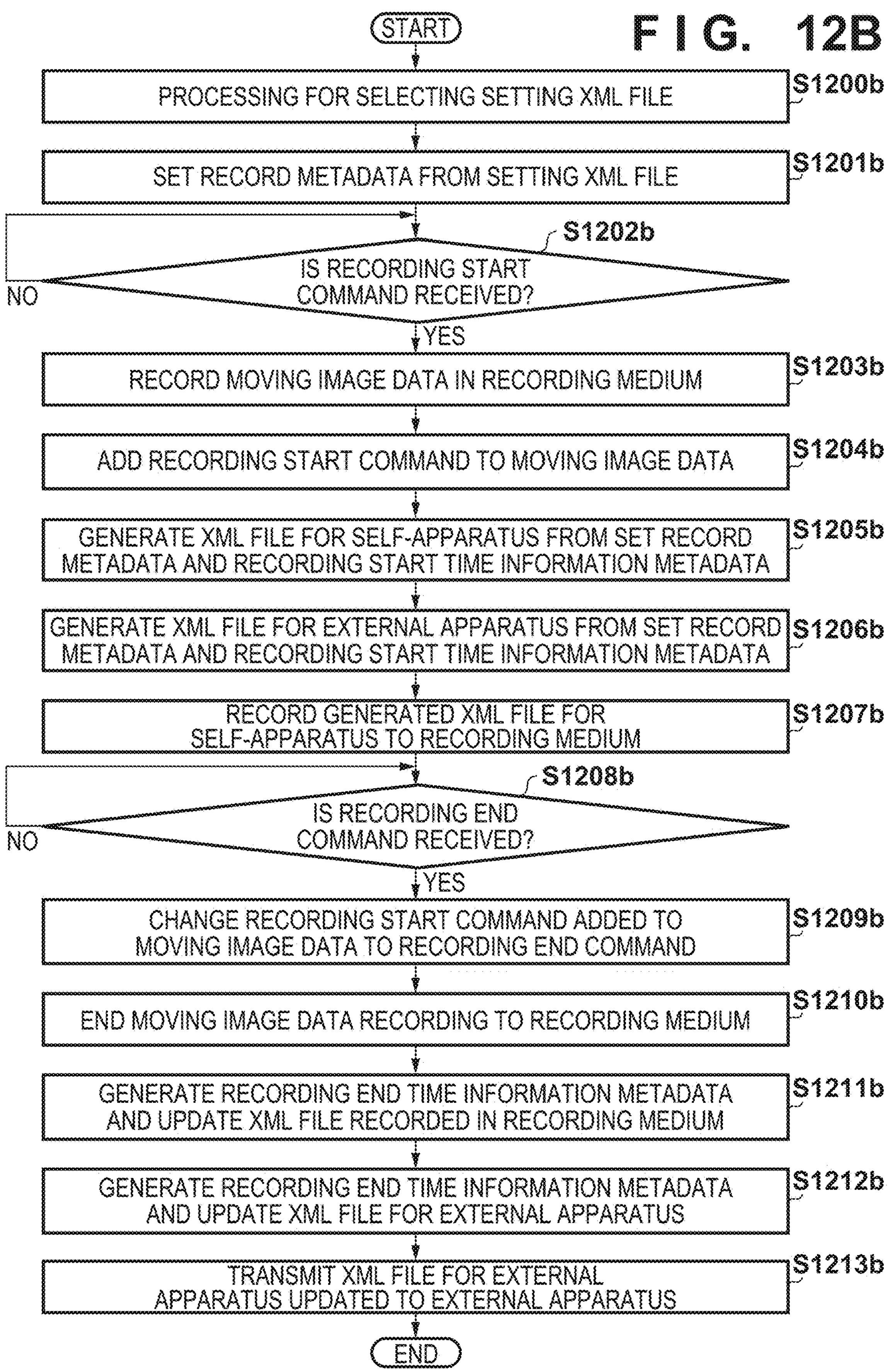
FIG. 12B
START
PROCESSING FOR SELECTING SETTING XML FILE
S1200b
SET RECORD METADATA FROM SETTING XML FILE
S1201b
S1202b
IS RECORDING START COMMAND RECEIVED?
NO
YES
RECORD MOVING IMAGE DATA IN RECORDING MEDIUM
S1203b
ADD RECORDING START COMMAND TO MOVING IMAGE DATA
S1204b
GENERATE XML FILE FOR SELF-APPARATUS FROM SET RECORD METADATA AND RECORDING START TIME INFORMATION METADATA
S1205b
GENERATE XML FILE FOR EXTERNAL APPARATUS FROM SET RECORD METADATA AND RECORDING START TIME INFORMATION METADATA
S1206b
RECORD GENERATED XML FILE FOR SELF-APPARATUS TO RECORDING MEDIUM
S1207b
S1208b
IS RECORDING END COMMAND RECEIVED?
NO
YES
CHANGE RECORDING START COMMAND ADDED TO MOVING IMAGE DATA TO RECORDING END COMMAND
S1209b
END MOVING IMAGE DATA RECORDING TO RECORDING MEDIUM
S1210b
GENERATE RECORDING END TIME INFORMATION METADATA AND UPDATE XML FILE RECORDED IN RECORDING MEDIUM
S1211b
GENERATE RECORDING END TIME INFORMATION METADATA AND UPDATE XML FILE FOR EXTERNAL APPARATUS
S1212b
TRANSMIT XML FILE FOR EXTERNAL APPARATUS UPDATED TO EXTERNAL APPARATUS
S1213b
END

Figures 13A, 13B:
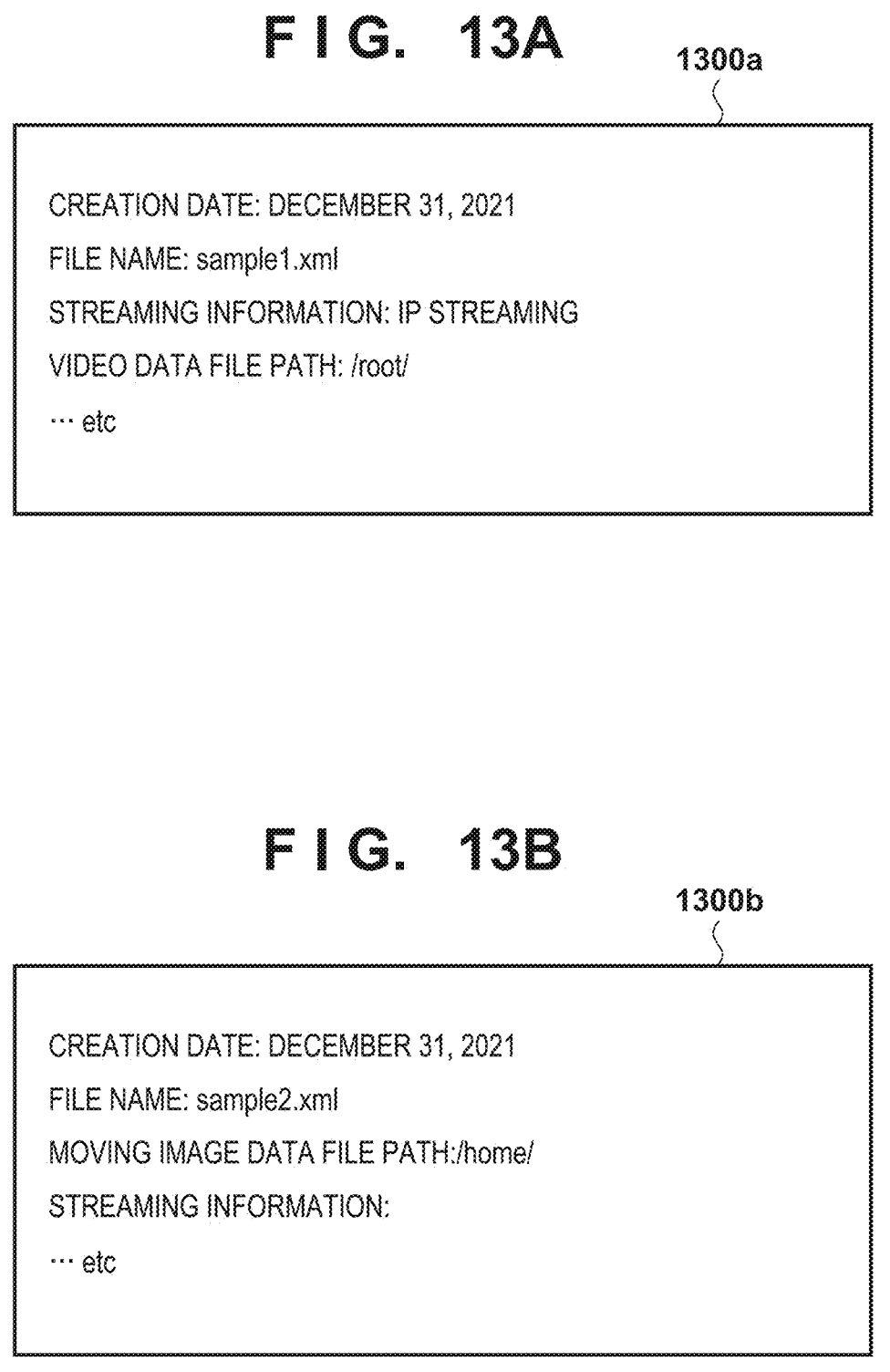

CREATION DATE: DECEMBER 31, 2021
FILE NAME: sample1.xml
STREAMING INFORMATION: IP STREAMING
VIDEO DATA FILE PATH: /root/
··· etc

CREATION DATE: DECEMBER 31, 2021
FILE NAME: sample2.xml
MOVING IMAGE DATA FILE PATH:/home/
STREAMING INFORMATION:
··· etc

IMAGE CAPTURING APPARATUS, CONTROL METHOD THEREOF, RECORDING MEDIUM, AND SYSTEM

CROSS-REFERENCE TO RELATED APPLICATIONS

This application is a Continuation of International Patent Application No. PCT/JP2023/030286, filed Aug. 23, 2023, which claims the benefit of Japanese Patent Application No. 2022-156461 filed Sep. 29, 2022, both of which are hereby incorporated by reference herein in their entirety.

BACKGROUND OF THE INVENTION

Field of the Invention

The present invention relates to an image capturing apparatus, a control method thereof, a recording medium, and a system.

Background Art

In recent news reporting sites of broadcasters, news agencies, and the like, IP-based broadcasting systems have been proliferated, and there is also used an IP streaming technology for continuously externally transmitting, via a network, moving image data that is being captured by a video processing apparatus such as a digital still camera or a digital video camera. In addition, additional information files in which various metadata concerning moving image data under image capturing are written are used, thereby more quickly and easily implementing news reporting of high immediacy. In an additional information file, for example, metadata such as the format and the record length of moving image data can be recorded together with the captured moving image data. Also, communication is performed between a portable terminal and a digital video camera, and in a news reporting site, coverage information such as a coverage title or a coverage location can be written in an additional information file. The additional information file is used as, for example, information for more easily searching for desired moving image data in a moving image data server. At this time, the format or the record length of moving image data can be known by browsing various kinds of metadata of the moving image data.

Among metadata (additional information) recorded in an additional information file associated with moving image data, there exists not only additional information set by a user but also additional information to be updated at the start of recording of moving image data and additional information to be updated at the end of recording. In PTL 1, when recording video data (moving image data), metadata associated with the moving image data is simultaneously created and stored in the self-apparatus. However, in a case where the self-video processing apparatus performs IP streaming and stores moving image data in an external apparatus of a communication destination, metadata to be referred to by the external apparatus may be insufficient if an additional information file stored in the self-apparatus is only directly transmitted to the external apparatus, like PTL 1.

The present invention has been made in consideration of the above-described problem, and provides a technique of allowing an apparatus that records moving image data to record not only the file of the moving image data but also a metadata file describing metadata from the start of recording to the end of recording of the moving image data by providing these files to the apparatus.

CITATION LIST

Patent Literature

PTL 1: Japanese Patent Laid-Open No. 2004-363825

SUMMARY OF THE INVENTION

In order to solve this problem, for example, an image capturing apparatus according to the present invention has the following configuration.

The present invention in its first aspect provides an image capturing apparatus including a communication unit and configured to transmit, via the communication unit, moving image data obtained by image capturing to an external apparatus configured to record the moving image data, comprising: at least one processor and/or circuit; and at least one memory storing computer program, which causes the at least one processor and/or circuit to function as following units: a moving image transmission unit configured to transmit, upon receiving an instruction to start recording, the moving image data obtained by image capturing by an image capturing unit to the external apparatus via the communication unit, and end, upon receiving an instruction to end the recording, the transmission of the moving image data to the external apparatus; a metadata generation unit configured to generate, upon receiving the instruction to start the recording, metadata associated with the start of the recording of the moving image data, and generate, upon receiving the instruction to end the recording, metadata associated with the end of the recording of the moving image data; and a metadata transmission unit configured to transmit, upon receiving the instruction to end the recording, metadata from the start of the recording to the end of the recording to the external apparatus via the communication unit.

The present invention in its second aspect provides a control method of an image capturing apparatus including a communication unit and configured to transmit, via the communication unit, moving image data obtained by image capturing to an external apparatus configured to record the moving image data, comprising: transmitting, upon receiving an instruction to start recording, the moving image data obtained by image capturing by an image capturing unit to the external apparatus via the communication unit, and ending, upon receiving an instruction to end the recording, the transmission of the moving image data to the external apparatus; generating, upon receiving the instruction to start the recording, metadata associated with the start of the recording of the moving image data, and generating, upon receiving the instruction to end the recording, metadata associated with the end of the recording of the moving image data; and transmitting, upon receiving the instruction to end the recording, metadata from the start of the recording to the end of the recording to the external apparatus via the communication unit.

The present invention in its third aspect provides a computer-readable recording medium on which is recorded a program for causing a computer to execute the method according to the second aspect.

The present invention in its fourth aspect provides a system comprising an image capturing apparatus connected to a network, and a recording apparatus, wherein the image capturing apparatus comprises: at least one processor and/or circuit; and at least one memory storing computer program, which causes the at least one processor and/or circuit of the image capturing apparatus to function as following units: a moving image transmission unit configured to transmit, upon receiving an instruction to start recording, the moving image data obtained by image capturing by image capturing means to the external apparatus, and end, upon receiving an instruction to end the recording, the transmission of the moving image data to the external apparatus; a metadata generation unit configured to generate, upon receiving the instruction to start the recording, metadata associated with the start of the recording of the moving image data, and generate, upon receiving the instruction to end the recording, metadata associated with the end of the recording of the moving image data; and a metadata transmission unit configured to transmit, upon receiving the instruction to end the recording, metadata from the start of the recording to the end of the recording to the external apparatus, and the recording apparatus comprises: at least one processor and/or circuit; and at least one memory storing computer program, which causes the at least one processor and/or circuit of the recording apparatus to function as following units: a first recording unit configured to record the moving image data received from the image capturing apparatus as a moving image file in a recording medium; and a second recording unit configured to record the metadata received from the image capturing apparatus as a metadata file associated with the recorded moving image file.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 2 is a view exemplarily showing the block configuration of a digital video camera.

FIG. 3 is a view exemplarily showing the structure of an XML file.

FIG. 5 is a flowchart exemplarily showing the basic operation of the digital video camera.

FIG. 7 is a flowchart exemplarily showing the basic operation of the network recorder.

FIG. 8A is a flowchart exemplarily showing the characteristic processing procedure of the digital video camera according to the first embodiment.

FIG. 12B is a flowchart exemplarily showing the characteristic processing procedure of a digital video camera according to the second embodiment.

FIG. 13A is a view exemplarily showing an example of metadata at the start of recording of an XML file for the digital video camera.

FIG. 13B is a view exemplarily showing an example of corrected metadata at the start of recording of the XML file for the network recorder.

DESCRIPTION OF THE EMBODIMENTS

Figure 1:
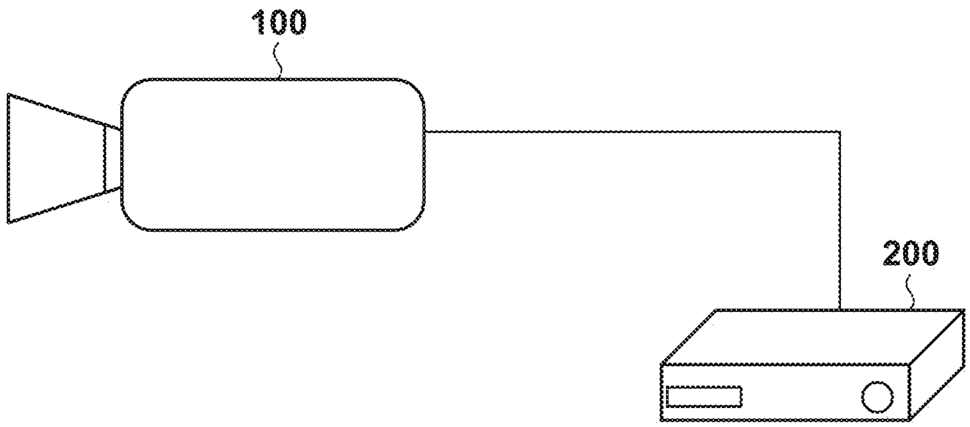
FIG. 1 is a view exemplarily showing a system configuration according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a view showing an example of a system configuration according to this embodiment. The system includes a digital video camera 100 that captures a moving image and creates and transmits metadata, and a network recorder 200 that stores the moving image data and the metadata transmitted from the digital video camera 100. In this embodiment, the digital video camera 100 and the network recorder 200 are connected by a local area network (LAN). The digital video camera 100 and the network recorder 200 may be connected via a network switch or the like. The communication protocol is an Internet protocol, but the type is not particularly limited. In addition, the connection form can be wired or wireless.

FIG. 2 is a view showing the block configuration of the digital video camera 100. The digital video camera 100 includes a control unit 101, an image compression/decompression unit 102, an image capturing unit 103, an image processing unit 104, a network I/F 105, a display unit 106, an operation unit 107, a ROM 108, a RAM 109, and a recording medium I/F 110. These constituent elements are driven by power obtained by rectifying AC power supplied from the outside into a predetermined voltage or power supplied from an internal battery (not shown).

The control unit 101 is formed by a processor such as a CPU and controls the entire apparatus. More specifically, the control unit 101 deploys a program recorded in the ROM 108 to the RAM 109 and executes it, thereby performing control of each constituent part and arithmetic processing and executing processing according to the flowcharts to be described later. The ROM 108 is a nonvolatile memory, and stores programs to be executed by the control unit 101 and various kinds of settings.

The RAM 109 is a volatile memory used as the work memory of the control unit 101. The RAM 109 is also used as a video random access memory (VRAM) that temporarily stores data to be displayed on the display unit 106 or image data captured by the image capturing unit 103 and processed by the image processing unit 104 or image data read out from a recording medium 111 to perform compression processing or decompression processing by the image compression/decompression unit 102. The RAM 109 is also used to temporarily store an extensible markup language (XML)

file to be recorded in association with a captured image or metadata to be written to the XML file. The XML file is generated based on the control of the control unit 101. To generate the XML file, metadata (additional information) included in a setting XML file received from an external apparatus via the network I/F 105 or a setting XML file recorded in the recording medium 111 and metadata that can be acquired at the start or completion of recording. Details of a metadata configuration included in the XML file will be described later with reference to FIG. 3.

The control unit 101 also functions as a display control unit because it generates display data and controls the display timing for the display unit 106. Also, the control unit 101 functions as a record control unit because it controls data record or read for the recording medium 111 via the recording medium I/F 110. The control unit 101 may be formed by a plurality of processors. The control unit 101 may be imparted with the function of another constituent part (for example, the image compression/decompression unit 102 or the image processing unit 104) and thus integrally formed. Alternatively, the control unit 101 may be imparted with the function of a part of another constituent part.

The recording medium 111 configured to record image data can be attached to the digital video camera 100. For this purpose, the digital video camera 100 includes the recording medium interface (I/F) 110. The recording medium I/F 110 has a slot to which the detachable recording medium 111 such as a memory card can be inserted. FIG. 2 shows an example in which the recording medium 111 is attached to the recording medium I/F 110. A description will be made assuming that the digital video camera 100 according to this embodiment is configured to record image data in the detachable recording medium 111. There is also a possible configuration in which moving image data is recorded in a recording medium that is undetachable and is incorporated in the digital video camera 100.

The recording medium 111 is used to record an XML file or moving image data obtained by capturing an image by the image capturing unit 103 and performing various kinds of processing by the image processing unit 104 and the image compression/decompression unit 102. Note that the type of the recording medium is not particularly limited and, for example, a recording medium such as an SD card (SD Memory Card)® or a CFExpress Card® can be applied to the recording medium 111.

The image processing unit 104 performs predetermined pixel interpolation, resize processing, or color conversion processing for image data captured by the image capturing unit 103. Also, the image processing unit 104 performs predetermined arithmetic processing using the captured image data. The control unit 101 performs various kinds of control (exposure control, auto white balance processing, and the like) concerning image capturing by the image capturing unit 103 based on the obtained operation result.

The image compression/decompression unit 102 performs processing of compression-coding image data after image processing by the image processing unit 104 and decompression (decoding) processing for image data read out from the recording medium 111.

The image capturing unit 103 includes an imaging lens (including a zoom lens and a focus lens) and an image capturing element. Based on the control of the control unit 101, the image capturing unit 103 captures an object, generates data such as still image data or moving image data, and outputs it.

Based on the control of the control unit 101, the network I/F 105 transmits/receives data to/from an external apparatus such as an external camera, a personal computer, a smartphone, or a tablet. By the network I/F 105, it is possible to transmit setting information and operation information of the digital video camera 100 to the external apparatus and receive, from the external apparatus, a command for operating the digital video camera 100 or an XML file to be recorded together with image data. The received data is stored in the RAM 109. Data that can be transmitted/received includes digital image data and analog video signals. In addition, the network I/F 105 transmits/receives data to/from the network recorder 200 based on the control of the control unit 101. By the network I/F 105, it is possible to transmit an XML file created by the digital video camera 100 or moving image data to the network recorder 200. Note that in this embodiment, if the network recorder 200 is connected, the control unit 101 consecutively continuously transmits moving image data obtained by capturing an image by the image capturing unit 103 and performing various kinds of processing by the image processing unit 104 and the image compression/decompression unit 102 to the network recorder 200 via the network I/F 105.

The display unit 106 is a display configured to display, based on the control of the control unit 101, various kinds of setting states, an image that is being captured by the image capturing unit 103, or an image read out from the recording medium and reproduced. The display unit 106 is formed as a display in a look-in-type viewfinder or a vari-angle liquid crystal monitor.

The operation unit 107 is an operation unit that accepts an operation from the user, including a power switch configured to supply power to the digital video camera 100, an image capturing start button, and a mode switch button capable of switching the mode to a camera mode (image capturing mode) or a reproduction mode. Note that if a touch panel is included in the operation unit 107, the touch panel can be of any one of various types of touch panels such as a resistance film type, an electrostatic capacitance type, a surface acoustic wave type, an infrared type, an electromagnetic induction type, an image recognition type, and an optical sensor type.

Figure 3:
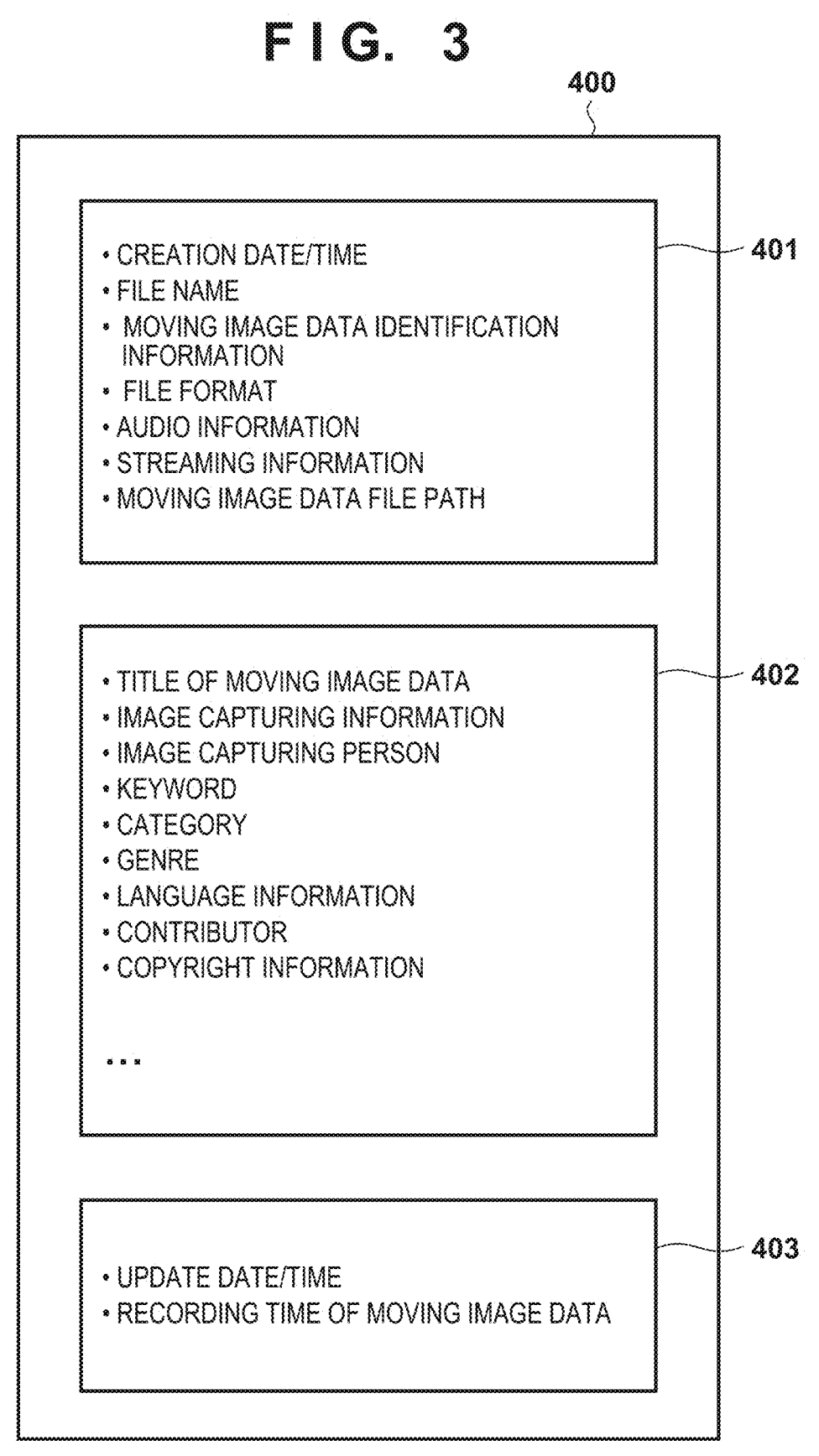

FIG. 3 shows an example of the configuration of metadata (additional information) included in an XML file recorded in association with moving image data in this embodiment. An XML file 400 is formed by metadata 401 recorded based on information read out at the start of recording, metadata 402 set by the user, and metadata 403 recorded based on information read out at the end of recording. Each piece of information of the metadata 401 is information determined at the start of recording of moving image data, and is additional information that is not changed after the start of recording. Examples of the information of the metadata 401 are a creation date/time, a file name, moving image data identification information, a file format, and audio information. Each piece of information of the metadata 402 is additional information set by the user, and examples are a moving image data title, image capturing information, an image capturing person, a keyword, a category, a genre, language information, and copyright information. Each piece of information of the metadata 403 is additional information determined at the end of recording of moving image data, and is information that cannot be read out at the start of recording of the moving image data. Examples are an update date/time and the record length (the recording time or the number of frames) of moving image data.

Figure 4:
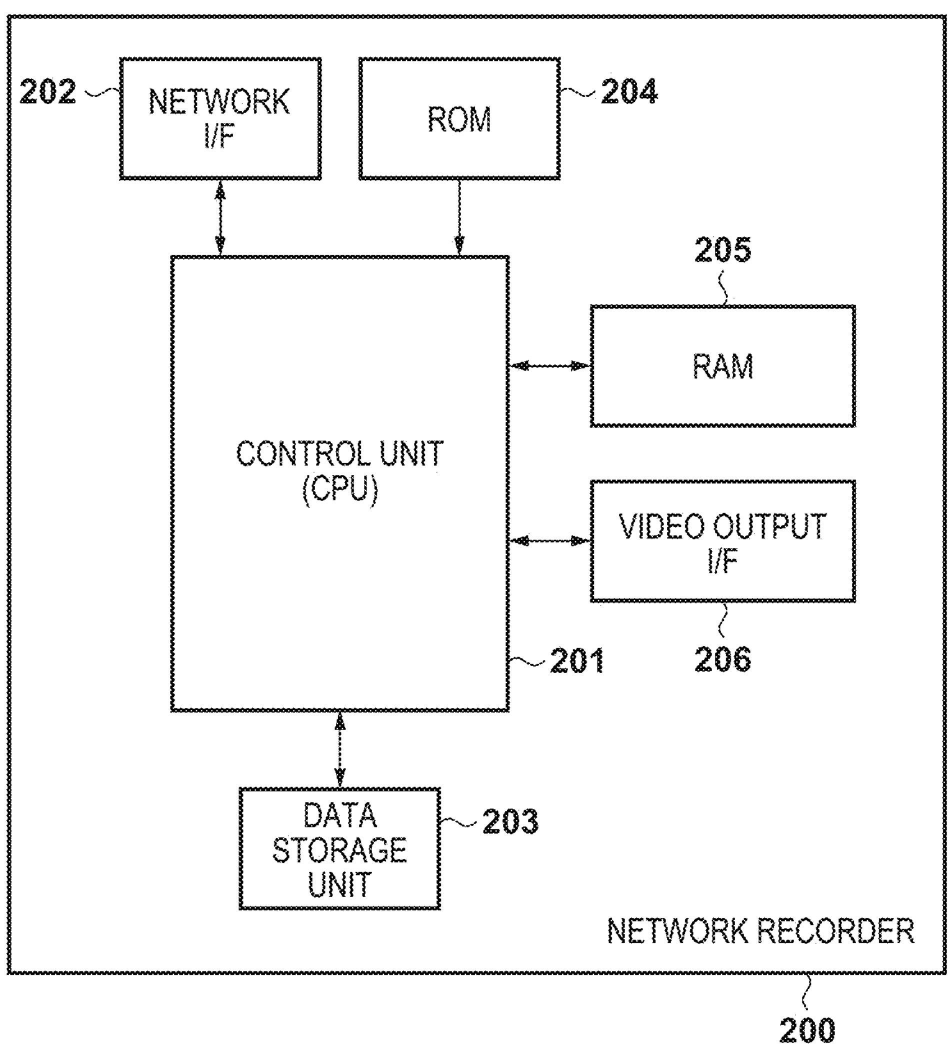
FIG. 4 is a view exemplarily showing the block configuration of a network recorder.

FIG. 4 is a block diagram of the network recorder 200. The network recorder 200 includes a control unit 201, a network I/F 202, a data storage unit 203, a ROM 204, a RAM 205, and a video output I/F 206. These constituent elements are driven by power obtained by rectifying AC power supplied from the outside into a predetermined voltage or power supplied from an internal battery (not shown).

The control unit 201 is formed by a processor such as a CPU and controls the entire apparatus. More specifically, the control unit 201 deploys a program recorded in the ROM 204 to the RAM 205 and executes it, thereby performing control of each constituent part and arithmetic processing and executing processing shown in the flowcharts to be described later.

The data storage unit 203 is a storage unit configured to store, as a file, moving image data or XML data transmitted from the digital video camera 100, and is formed by, for example, a mass recording apparatus such as a solid state drive (SSD) or a hard disk drive (HDD).

The ROM 204 is a nonvolatile recording medium, and stores programs to be executed by the control unit 201 and various kinds of setting information.

The RAM 205 is a volatile recording medium used as the work memory of the control unit 201. The RAM 205 is also used as a VRAM. Also, the control unit 201 functions as a video control unit because it controls video output to a video output device such as a display via the video output I/F 206. The control unit 201 may be formed by a plurality of processors. The control unit 201 may be imparted with the function of another constituent part (for example, the data storage unit 203) and thus integrally formed. Alternatively, the control unit 201 may be imparted with the function of a part of another constituent part.

FIG. 5 is an operation flowchart showing the basic operation of the digital video camera 100. The control unit 101 reads out a program stored in the ROM 108, deploys it to the RAM 109, and executes the deployed program, thereby performing control of each unit and arithmetic processing associated with the operation flowchart. Upon detecting that the digital video camera 100 is set in the camera mode (image capturing mode) by a user operation on the operation unit 107, the control unit 101 starts processing shown in FIG. 5. Note that in this embodiment, if the digital video camera 100 has been connected to the network recorder 200 at the start of the procedure shown in FIG. 5, the digital video camera 100 is consecutively continuously transmitting moving image data to the connected network recorder 200. The processing shown in FIG. 5 is merely an example, and the order is not limited.

Figure 6:
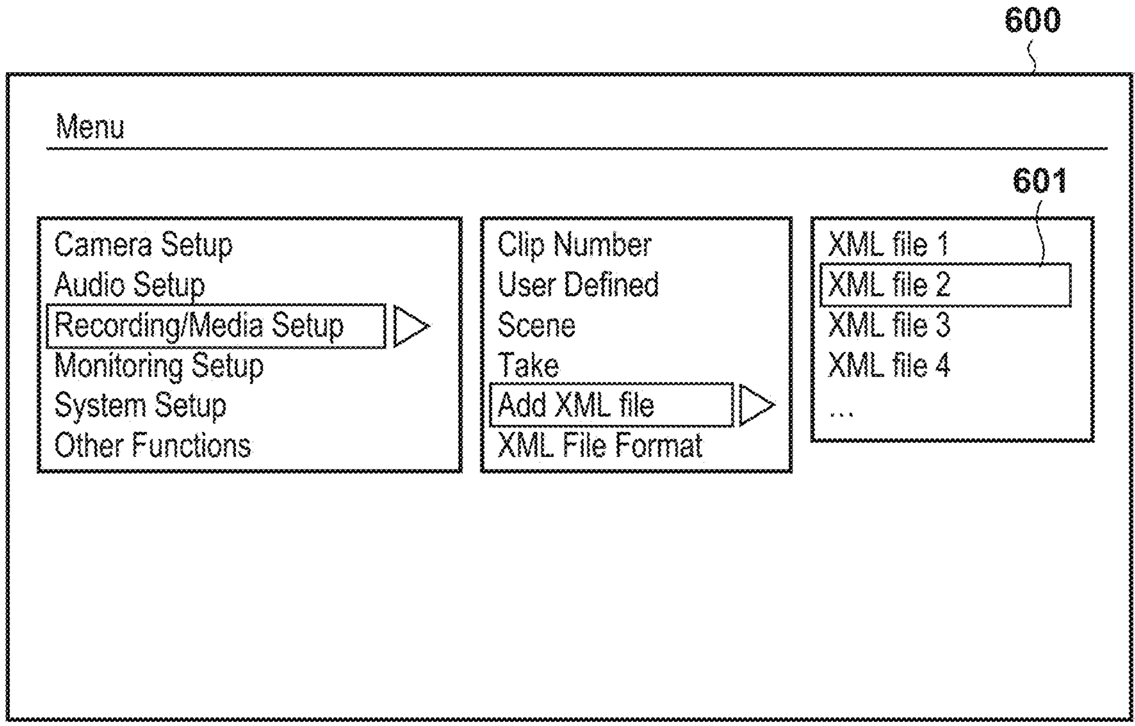
FIG. 6 is a view exemplarily showing a setting XML file selection UI.

In step S500, the control unit 101 detects a user operation on a menu button included in the operation unit 107, thereby causing the display unit 106 to display a menu 600 as shown in FIG. 6. The user can select, from items of the menu 600, a setting XML file by operating a selection cursor 601 using a 4-way selector included in the operation unit 107. When the setting XML file is selected by the user, the process advances to step S501.

Note that FIG. 6 shows that "Recording/Media Setup" is selected in the main menu, "Add XML file" is selected in a sub-menu displayed in accordance with the selection, and "XML file 2" is selected as an XML file from a sub-menu.

In step S501, the control unit 101 reads out the contents of the setting XML file selected in step S500 from the recording medium 111 to the RAM 109 via the recording medium I/F 110. The control unit 101 then writes, as record metadata, only information necessary for an XML file to be recorded in association with moving image data to the RAM 109 in accordance with the structure of the XML file.

In step S502, the control unit 101 determines whether a moving image data recording start instruction from the user is input via the operation unit 107. Upon determining that the recording start instruction is input, the control unit 101 advances the process to step S503. Upon determining that the recording start instruction is not input, the control unit 101 returns the process to step S502 to wait for the input.

In step S503, in accordance with the input of the recording start instruction in step S502, the control unit 101 writes (records), in the recording medium 111, moving image data obtained by capturing an image by the image capturing unit 103 and performing various kinds of processing by the image processing unit 104 and the image compression/decompression unit 102.

In step S504, the control unit 101 reads out the moving image data from the RAM 109, transmits it to the network recorder 200 via the network I/F 105, and also transmits a recording start command. At this time, the control unit 101 acquires the time of recording start from a timer (not shown). Note that the recording start command is a command used to start recording of moving image data on the side of the network recorder 200 if the network recorder 200 connected to the digital video camera 100 receives it.

In step S505, the control unit 101 writes, as recording start time information metadata, information that can be acquired at the start of recording of the moving image data in accordance with generation of the moving image data to the RAM 109. Note that if the moving image data is recorded in the network recorder 200, the recording start time information metadata includes information indicating that the moving image data is being transmitted to the network recorder 200. Then, the control unit 101 writes the XML file to the RAM 109 using the recording start time information metadata written to the RAM 109 and the record metadata written to the RAM 109 in step S501. That is, in the XML file shown in FIG. 3, the recording start time information metadata is set as the metadata 401 as shown in FIG. 13A, and the record metadata is set as the metadata 402, and the XML file is then written to the RAM 109. At this time, the XML file may be generated by setting each piece of information of the metadata 403 to blank or 0, or the XML file that does not include the metadata 403 may be generated.

In step S506, the control unit 101 reads out the XML file generated in step S505 from the RAM 109, and writes it to the recording medium 111 via the recording medium I/F 110 in association with the moving image data recorded in the recording medium 111 in step S503.

In step S507, the control unit 101 determines whether a moving image data recording end instruction from the user is input via the operation unit 107. Upon determining that the recording end instruction is input, the control unit 101 advances the process to step S508. On the other hand, upon determining that the recording end instruction is not input, the control unit 101 returns the process to step S507 to continue moving image data recording until the recording end instruction is input.

In step S508, the control unit 101 overwrites the recording end command on the recording start command written to the RAM 109 in step S504. Note that the network recorder 200 connected to the digital video camera 100 receives the recording end command, thereby ending recording of the moving image data.

In step S509, the control unit 101 writes the moving image data captured until the input of the recording end instruction to the recording medium 111 as moving image data. The control unit 101 then writes or updates the header of the moving image data and completes the moving image data recording processing.

In step S510, the control unit 101 writes information that can be acquired at the end of recording of the moving image data as recording end time information metadata to the RAM 109. At this time, the control unit 101 acquires the time of the timing of recording end from the timer (not shown), and subtracts the time of the start of recording, thereby calculating the recording time. Then, the control unit 101 reads out the XML file recorded in the recording medium 111 in step S506, adds the recording end time information metadata as the metadata 403 to the XML file, and records the XML file in the recording medium 111. Since each piece of information of the metadata 403 determined at the end of recording is not recorded in the XML file written to the recording medium 111 in step S506, information that should be recorded is not included in the XML file. Hence, the control unit 101 overwrites the XML file in which each piece of information of the metadata 403 is described in step S510 on the XML file recorded in the recording medium 111 in step S506, and completes recording of the XML file. Note that the processing of step S510 may be executed, without waiting for completion of recording of the moving image data, at the timing at which the recording end time information metadata can be generated, that is, at the timing of moving image data recording completion at which the information of the recording time of the moving image data can be acquired. Hence, recording of the XML file may be completed before completion of recording of the moving image data.

By executing the above-described steps, the digital video camera 100 can store the moving image data and the XML file associated with the moving image data in the recording medium 111.

Figure 7:
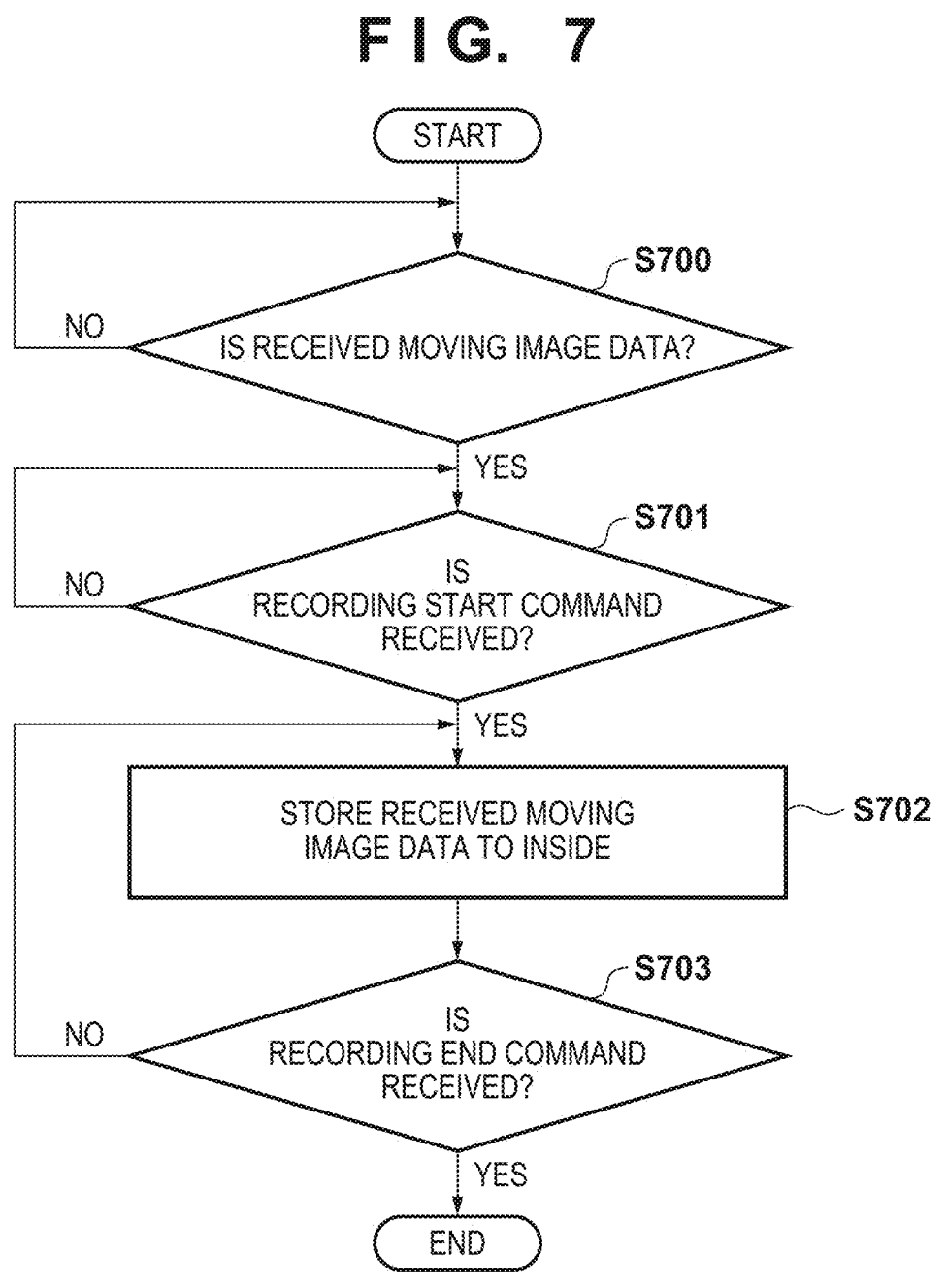

FIG. 7 is an operation flowchart showing the basic operation of the network recorder 200. The control unit 201 reads out a program stored in the ROM 204, deploys it to the RAM 205, and executes the deployed program, thereby performing control of each unit and arithmetic processing associated with the operation flowchart. Note that the processing shown in FIG. 7 is merely an example, and the order is not limited.

In step S700, the control unit 201 determines whether moving image data is received from the digital video camera 100 via the network I/F 202. Upon determining that moving image data is received, the control unit 201 advances the process to step S701. Upon determining that moving image data is not received, the control unit 201 returns the process to step S700 to wait for reception. That is, the control unit 201 repeats the processing of step S700 until moving image data is received.

In step S701, the control unit 201 determines whether a recording start command is received from the digital video camera 100 via the network I/F 202. Upon determining that the recording start command is received, the control unit 201 advances the process to step S702. Upon determining that the recording start command is not received, the control unit 201 returns the process to step S701 to wait for reception. That is, the control unit 201 repeats the processing of step S701 until the recording start command is received.

In step S702, the control unit 201 stores, in the data storage unit 203, the moving image data received from the external apparatus (digital video camera 100) via the network I/F 202. Note that if the moving image data is consecutively continuously received from the external apparatus, the control unit 201 sequentially continuously stores the received moving image data in the data storage unit 203.

In step S703, the control unit 201 determines whether a recording end command is received from the digital video camera 100 via the network I/F 202. Upon determining that the recording end command is received, the control unit 201 ends the moving image data recording operation. On the other hand, upon determining that the recording end command is not received, the control unit 201 returns the process to S702. That is, the control unit 201 repeats the processing of steps S702 and S703 until the recording end command is received.

By executing the above-described steps, the network recorder 200 can store, in the data storage unit 203, the moving image data received from the digital video camera 100.

FIG. 8A is an operation flowchart showing the characteristic operation of the digital video camera 100 according to this embodiment. The control unit 101 reads out a program stored in the ROM 108, deploys it to the RAM 109, and executes the deployed program, thereby performing control of each unit and arithmetic processing associated with the operation flowchart. If the digital video camera 100 is set in the camera mode (image capturing mode) by a user operation on the operation unit 107, the control unit 101 starts processing shown in FIG. 8A. Note that the processing shown in FIG. 8A is merely an example, and the order is not limited. Steps S800*a* to S805*a* in FIG. 8A are the same as steps S500 to S505 in FIG. 5, and a description thereof will be omitted.

In step S806*a*, the control unit 101 writes information that can be acquired at the start of recording of moving image data as recording start time information metadata to the RAM 109. Note that if the moving image data is recorded in the camera, the recording start time information metadata also includes information indicating that the moving image data is recorded in the camera. Using the recording start time information metadata written to the RAM 109 and the record metadata written to the RAM 109 in step S801*a*, the control unit 101 writes an XML file for the network recorder 200 to the RAM 109. That is, in the XML file shown in FIG. 3, the control unit 201 sets the recording start time information metadata as the metadata 401 as shown in FIG. 13B, sets the record metadata as the metadata 402, and writes the XML file to the RAM 109. At this time, the XML file may be generated by setting each piece of information of the metadata 403 to blank or 0, or the XML file that does not include the metadata 403 may be generated.

In steps S807*a* to S811*a*, the control unit 101 performs the same processing as in steps S506 to S510 of FIG. 5 using the XML file for the digital video camera 100 created in step S805*a*.

In step S812*a*, the control unit 101 writes information that can be acquired at the time of the end of recording of the moving image data as recording end time information metadata to the RAM 109. The control unit 101 then adds the recording end time information metadata as the metadata 403 and writes it to the RAM 109. Each piece of information of the metadata 403 determined at the end of recording is not recorded in the XML file for the network recorder 200, which is recorded in the RAM 109 in step S806*a*, and information that should be recorded is not included in the XML file. Hence, in step S812*a*, the control unit 201 generates an XML file in which each piece of information of the metadata 403 is described, writes (overwrites) it to the RAM 109, and completes storage of the XML file. Note that the processing of step S812*a* is executed, without waiting for completion of recording of the moving image data, at the timing at which the recording end time information metadata can be generated, that is, at the timing of moving image data recording completion at which the information of the recording time of the moving image data can be acquired. Hence, recording of the XML file in the network recorder 200 may be completed before completion of recording of the moving image data. Also, the control unit 101 may acquire, from the network recorder 200, metadata necessary for updating the XML file for the network recorder 200, for example, the file name of the moving image data that the network recorder 200 has recorded, and add it to the recording end time information metadata. If the write of the XML file for the network recorder 200 is completed, the control unit 101 advances the process to step S813*a*.

In step S813*a*, the control unit 101 reads out the XML file for the network recorder 200, which is stored in step S812*a*, from the RAM 109, and transmits it to the network recorder 200. Note that in this embodiment, the data is transmitted as an XML file to the network recorder 200. However, the data described in the XML file for the network recorder 200 may be read out from the RAM 109 and directly transmitted to the network recorder 200 without generating an XML file. Also, if two or more external apparatuses are connected to the digital video camera 100, the XML file may be transmitted to all the external apparatuses.

Figure 8B:
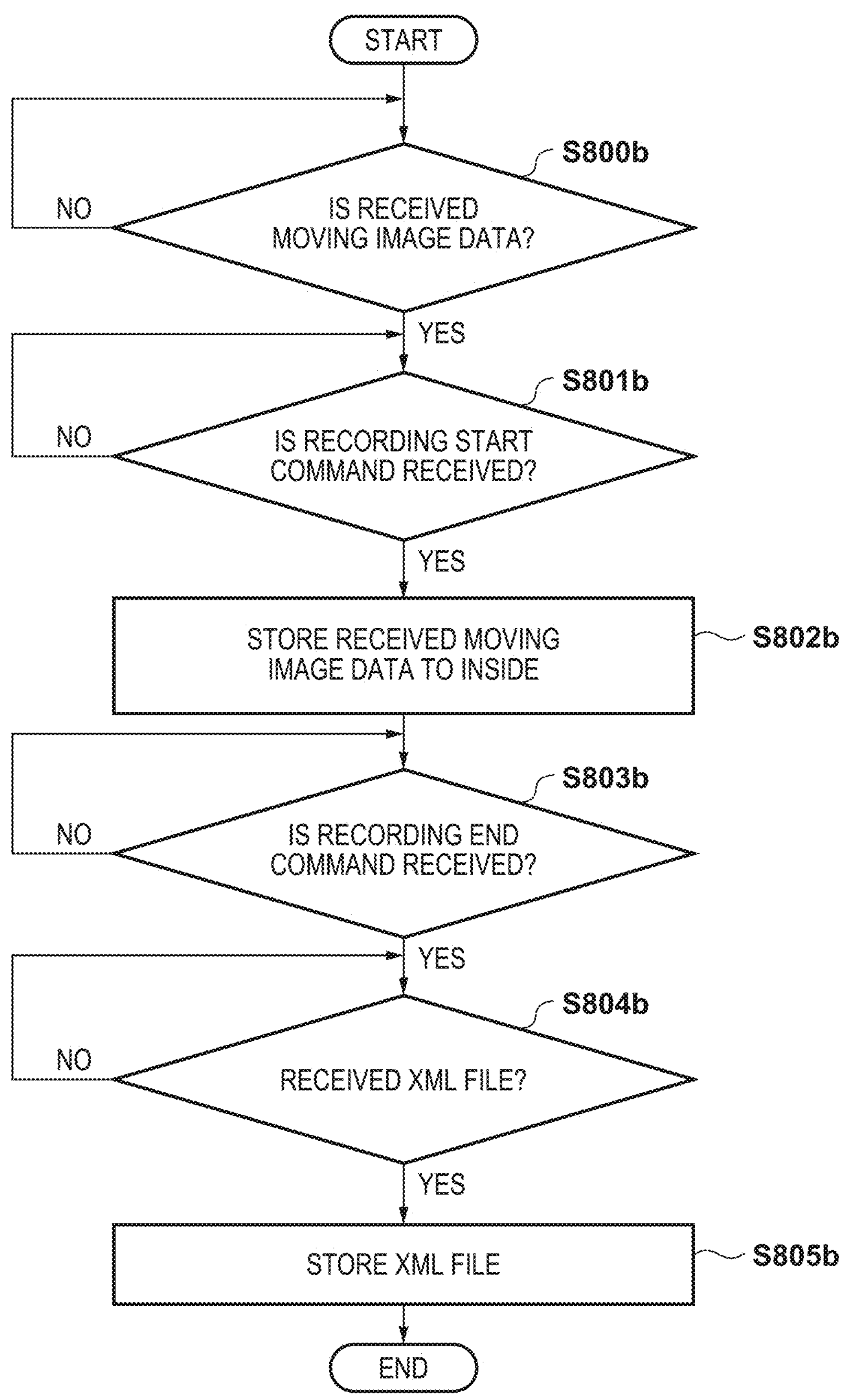
FIG. 8B is a flowchart exemplarily showing the characteristic processing procedure of the network recorder according to the first embodiment.

FIG. 8B is an operation flowchart showing the characteristic operation of the network recorder 200 according to this embodiment. The control unit 201 reads out a program stored in the ROM 204, deploys it to the RAM 205, and executes the deployed program, thereby performing control of each unit and arithmetic processing associated with the operation flowchart. Note that the processing shown in FIG. 8B is merely an example, and the order is not limited.

Steps S800*b* to S803*b* are the same as steps S700 to S703 in FIG. 7, and a description thereof will be omitted.

In step S804*b*, the control unit 201 determines whether an XML file is received from the digital video camera 100 via the network I/F 202. Upon determining that an XML file is received, the control unit 201 advances the process to step S805*b*. Upon determining that an XML file is not received, the control unit 201 returns the process to step S804*b*. That is, the control unit 201 repeats the processing of step S804*b* until an XML file is received.

In step S805*b*, the control unit 201 writes the XML file received from the external apparatus via the network I/F 202 to the data storage unit 203 in association with the moving image data stored in the data storage unit 203 in step S802*b*.

As described above, the digital video camera 100 starts transmitting moving image data to the network recorder 200 at the start of recording, and simultaneously transmits a command to instruct the timing of recording the moving image data in the network recorder 200. The digital video camera 100 then ends the transmission of the moving image data by transmitting a command to instruct the end of recording after the recording of the moving image data is ended (stopped), completes generation of a metadata file (XML file) to be used in the network recorder 200, and transmits the generated metadata file to the network recorder 200. Thus, the network recorder 200 can store the moving image captured by the digital video camera 100 as a moving image data file and store the metadata file corresponding to the moving image data file in association.

Note that when the recording end command is received, the control unit 201 of the network recorder 200 may transmit the file name of the recorded moving image data to the digital video camera 100. Upon receiving the file name, the control unit 101 of the digital video camera 100 adds the file name to the XML file to be transmitted and then transmits the XML file to the network recorder 200. Thus, the moving image data recorded in the network recorder 200 and the XML file can firmly be associated with each other.

Second Embodiment

Figure 9:
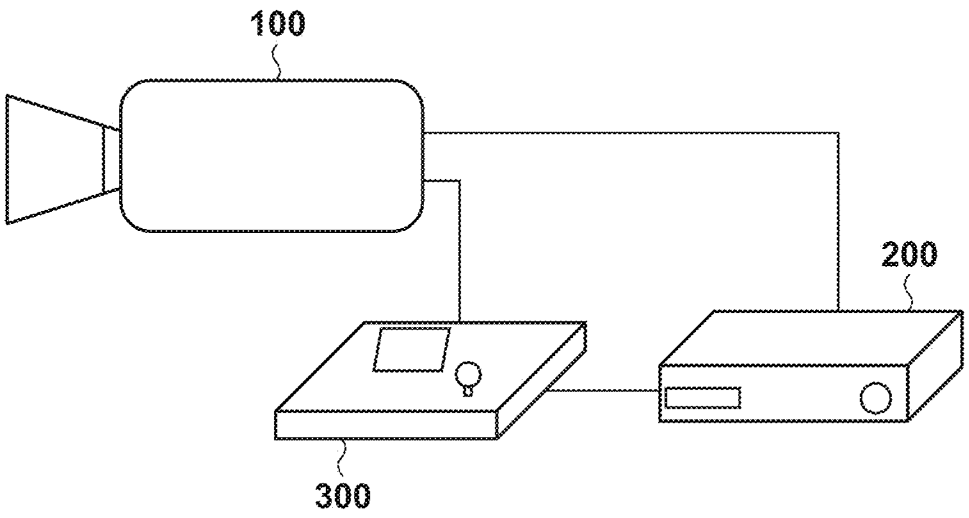
FIG. 9 is a view exemplarily showing a system configuration according to the second embodiment.

The second embodiment will be described below. FIG. 9 is a view showing an example of a system configuration according to the second embodiment. The system includes a digital video camera 100 that captures a moving image and creates and transmits metadata, a network recorder 200 that stores the moving image data and the metadata transmitted from the digital video camera 100, and a controller 300 that remotely controls the digital video camera 100.

The configurations of the digital video camera 100 and the network recorder 200 are the same as in the above-described first embodiment. The controller 300 according to the second embodiment outputs recording start and recording end instructions to the digital video camera 100 in accordance with a user operation. That is, the controller 300 is used to perform, from the outside, processing corresponding to steps S502 and S507 in FIG. 5 of the first embodiment.

The network recorder 200 executes the same procedure as the procedure described with reference to FIG. 8B. In the second embodiment, the digital video camera 100, the network recorder 200, and the controller 300 are connected by a local area network (LAN) so that these can communicate with each other. Note that the digital video camera 100, the network recorder 200, and the controller 300 may be connected via a network switch or the like. In addition, the communication protocol is not particularly limited, and the connection form can be wired or wireless.

Figure 10:
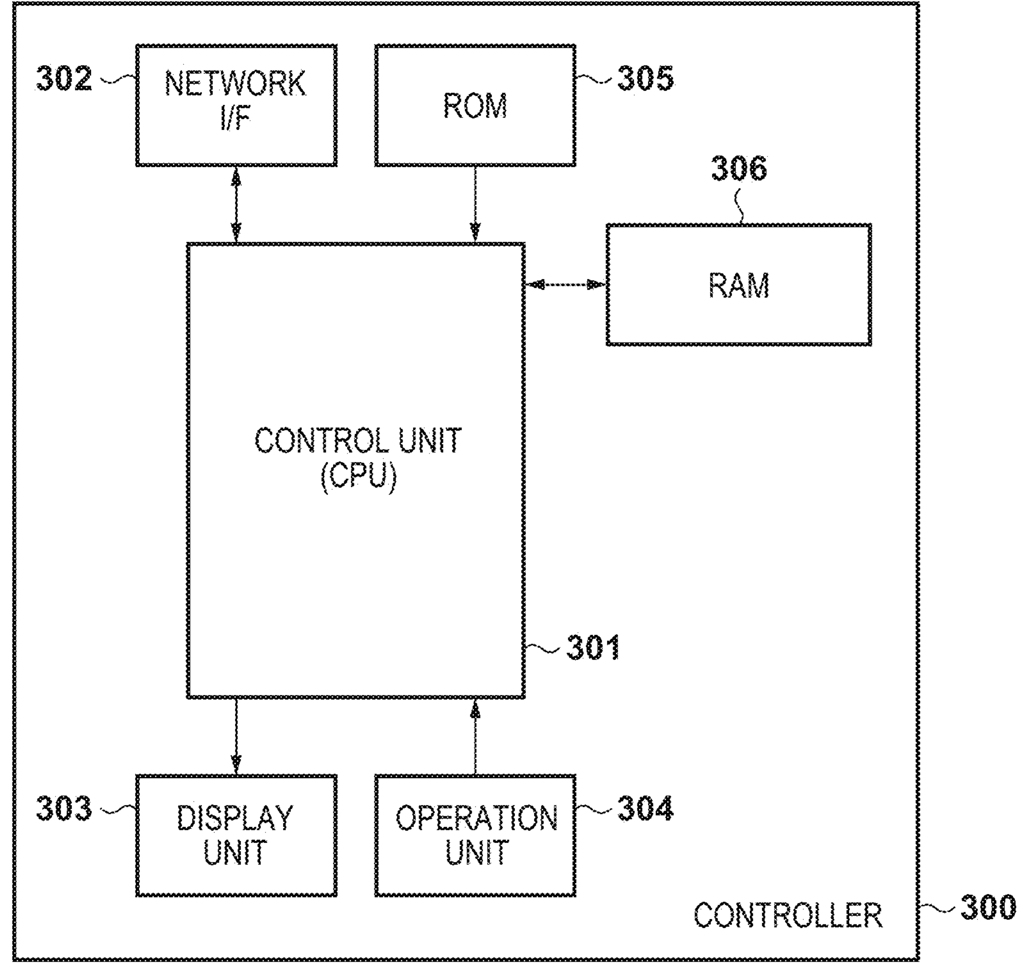
FIG. 10 is a view exemplarily showing the block configuration of a controller.

FIG. 10 is a block diagram of the controller 300. The controller 300 includes a control unit 301, a network I/F 302, a display unit 303, an operation unit 304, a ROM 305, and a RAM 306. These constituent elements are connected such that these can exchange data with each other. Also, the constituent elements are driven by power supplied from a plug socket or power supplied from a battery.

The control unit 301 is a system control unit such as a CPU that controls the whole system of the controller 300. The control unit 301 deploys a program recorded in the ROM 305 to the RAM 306 and executes the deployed program, thereby performing control of each constituent part and arithmetic processing and executing flowcharts to be described later. Note that the control unit 301 also functions as a display control unit because it generates display data and controls the display timing for the display unit 303. Also, the control unit 301 may be formed by a plurality of processors. The control unit 301 may be imparted with the function of another constituent part (for example, the operation unit 304) and thus integrally formed. Alternatively, the control unit 301 may be imparted with the function of a part of another constituent part.

The ROM 305 is a nonvolatile recording medium, and stores programs to be executed by the control unit 301 and various kinds of settings.

The RAM 306 is a volatile recording medium used as the work memory of the control unit 301. The RAM 306 is also used as a VRAM that temporarily stores data to be displayed on the display unit 303

Based on the control of the control unit 301, the network I/F 302 transmits/receives data to/from a connected external apparatus. The control unit 301 can transmit a command for operating the external apparatus to the external apparatus via the network I/F 302. Also, the control unit 301 receives setting information and operation information of the external apparatus from the external apparatus and stores the information in the RAM 306.

The display unit 303 is a display configured to display, based on the control of the control unit 301, various kinds of setting states or received setting information of the external apparatus.

The operation unit 304 is an operation unit that accepts an operation from the user, including a power switch configured to supply power to the controller 300 and an operation button used to operate the digital video camera 100. Note that if a touch panel is included in the operation unit 304, the control unit 301 can detect the following operations on the touch panel. The touch panel can be of any one of various types of touch panels such as a resistance film type, an electrostatic capacitance type, a surface acoustic wave type, an infrared type, an electromagnetic induction type, an image recognition type, and an optical sensor type.

Figure 11:
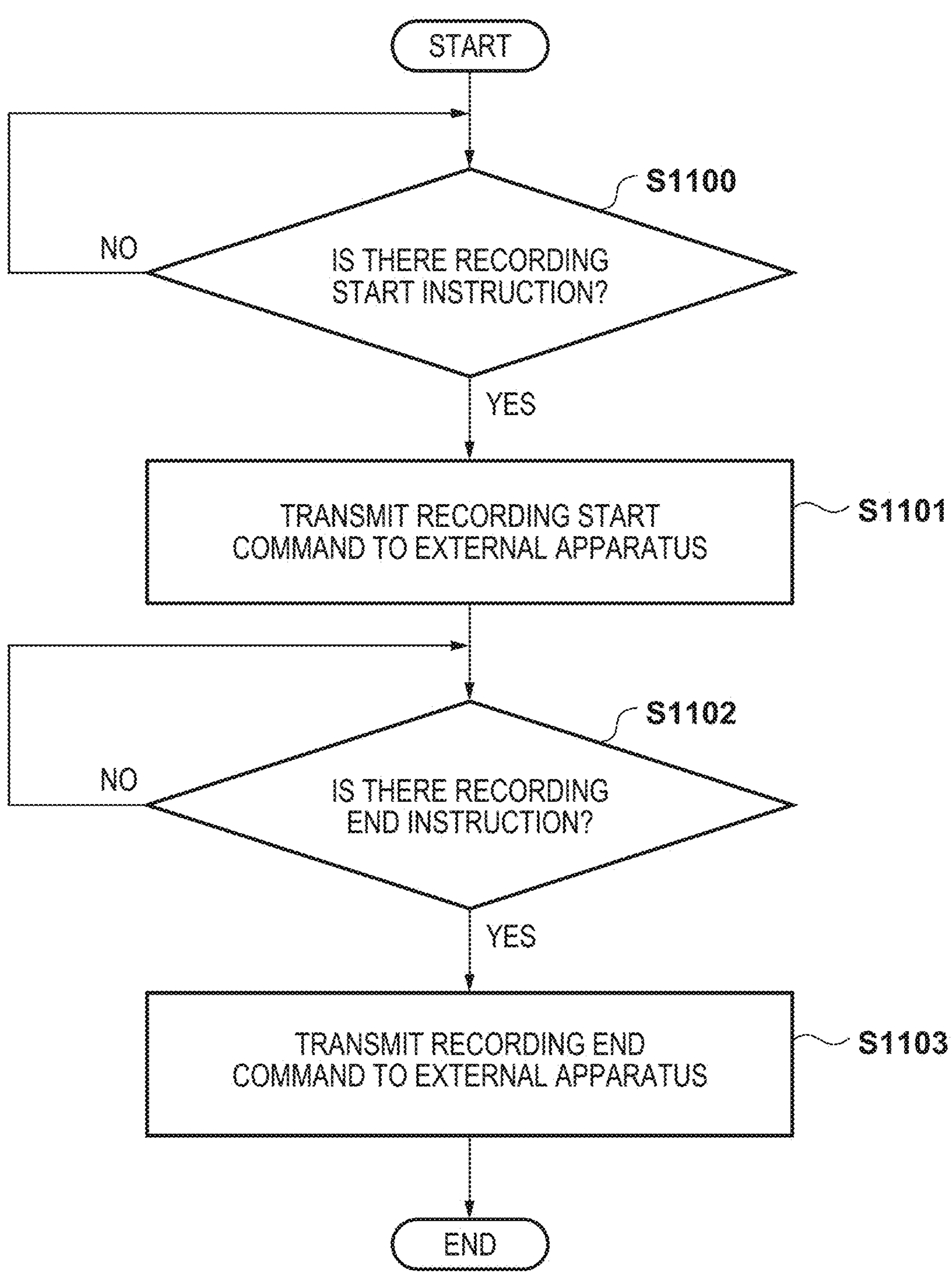
FIG. 11 is a flowchart exemplarily showing the basic operation of the controller.

FIG. 11 is an operation flowchart showing the basic operation of the controller 300. The control unit 301 reads out a program stored in the ROM 305, deploys it to the RAM 306, and executes the deployed program, thereby performing control of each unit and arithmetic processing associated with the operation flowchart. Note that the processing shown in FIG. 11 is merely an example, and the order is not limited.

In step S1100, the control unit 301 determines whether a moving image data recording start instruction from a user is input via the operation unit 304. Upon determining that the recording start instruction is input, the control unit 301 advances the process to step S1101. Upon determining that the recording start instruction is not input, the control unit 301 returns the process to step S1100. That is, the control unit 301 repeats the processing of step S1100 until the recording start instruction is input.

In step S1101, the control unit 301 transmits a recording start command to an external apparatus via the network I/F 302.

In step S1102, the control unit 301 determines whether a moving image data recording end instruction from the user is input via the operation unit 304. Upon determining that the recording end instruction is input, the control unit 301 advances the process to step S1103. Upon determining that the recording end instruction is not input, the control unit 301 returns the process to step S1102. That is, the control unit 301 repeats the processing of step S1102 until the recording end instruction is input.

In step S1103, the control unit 301 transmits a recording end command to the external apparatus via the network I/F 302, and ends the processing.

Figure 12A:
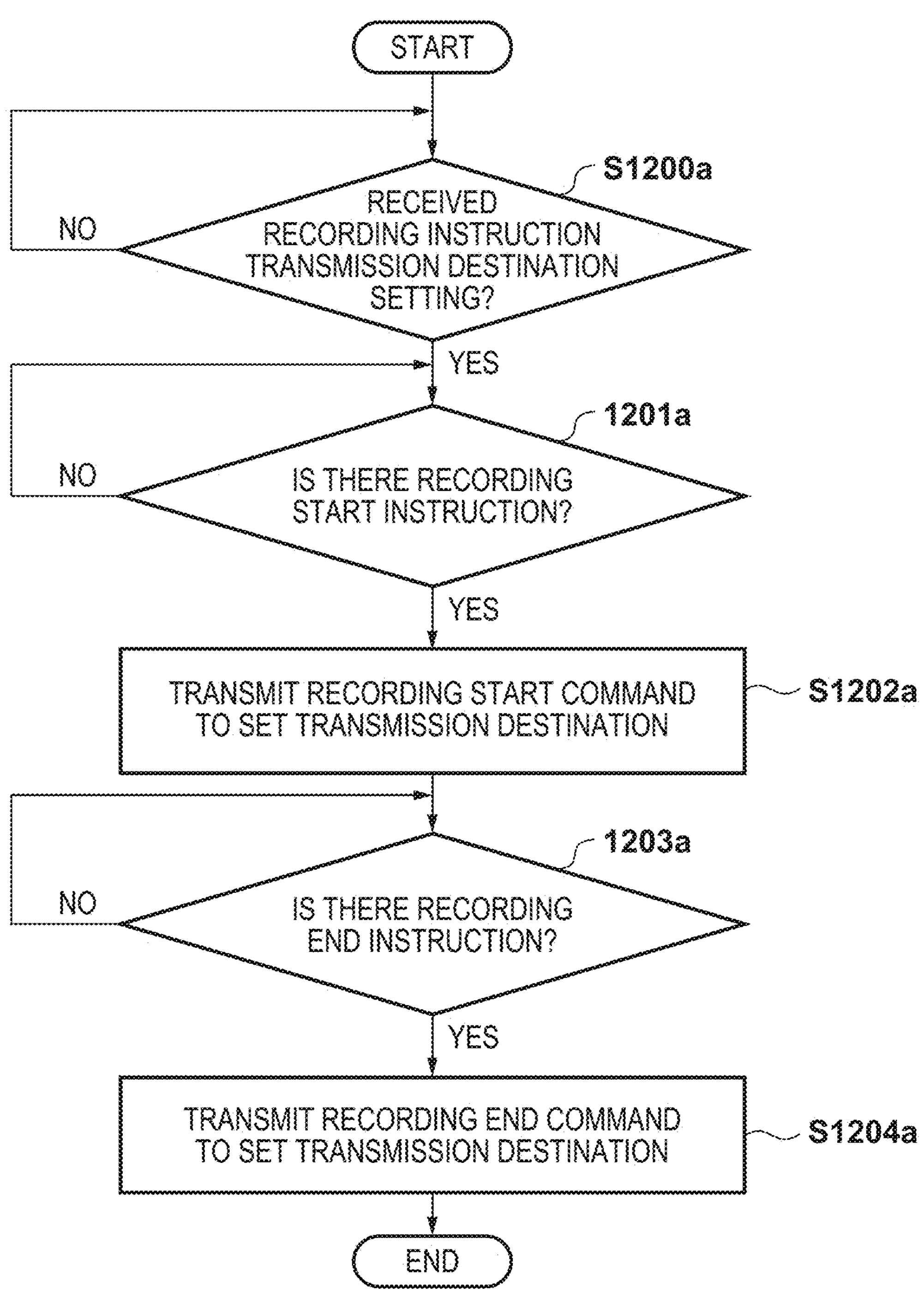
FIG. 12A is a flowchart exemplarily showing the characteristic processing procedure of the controller according to the second embodiment.

FIG. 12A is an operation flowchart showing the characteristic operation of the controller 300 according to this embodiment. The control unit 301 reads out a program stored in the ROM 305, deploys it to the RAM 306, and executes the deployed program, thereby performing control of each unit and arithmetic processing associated with the operation flowchart. Note that the processing shown in FIG. 12A is merely an example, and the order is not limited.

In step S1200*a*, the control unit 301 determines whether an instruction to designate (or select) an apparatus (corresponding to the digital video camera 100 in the embodiment) to which an instruction concerning moving image data recording is to be transmitted is input via the operation unit 304. Upon determining that the instruction to designate an apparatus to which an instruction is to be transmitted is input, the control unit 301 advances the process to step S1201*a*. Upon determining that the designation instruction is not input, the control unit 301 returns the process to step S1200*a*. That is, the control unit 301 repeats the processing of step S1200*a* until the instruction to designate an apparatus to which an instruction concerning recording is to be transmitted is input. Note that there may be a plurality of apparatuses to which the instruction concerning recording is to be transmitted, and the number is not particularly limited.

In step S1201*a*, the control unit 301 determines whether a moving image data recording start instruction from the user is input via the operation unit 304. Upon determining that the recording start instruction is input, the control unit 301 advances the process to step S1202*a*. Upon determining that the recording start instruction is not input, the control unit 301 returns the process to step S1201*a*. That is, the control unit 301 repeats the processing of step S1201*a* until the moving image data recording start instruction is input.

In step S1202*a*, the control unit 301 transmits a recording start command to the apparatus set in step S1200*a* via the network I/F 302. Note that if a plurality of apparatuses are selected in step S1200*a*, the control unit 301 transmits the recording start command to all the apparatuses, but the timing of transmitting the recording start command may be different.

In step S1203*a*, the control unit 301 determines whether a moving image data recording end instruction from the user is input via the operation unit 304. Upon determining that the recording end instruction is input, the control unit 301 advances the process to step S1204*a*. Upon determining that the recording end instruction is not input, the control unit 301 returns the process to step S1203*a*. That is, the control unit 301 repeats the processing of step S1203*a* until the moving image data recording end instruction is input.

In step S1204*a*, the control unit 301 transmits a recording end command to the apparatus designated in step S1200*a* via the network I/F 302, and ends the processing. Note that if a plurality of apparatuses are selected in step S1200*a*, the control unit 301 transmits the recording end command to all the apparatuses, but the timing of transmitting the recording end command may be different.

By executing the above-described steps, the controller 300 can remotely control the digital video camera 100 such that the moving image data recording start and recording end commands for the network recorder 200 are sent.

FIG. 12B is an operation flowchart showing the characteristic operation of the digital video camera 100 according to the second embodiment. A control unit 101 reads out a program stored in a ROM 108, deploys it to a RAM 109, and executes the deployed program, thereby performing control of each unit and arithmetic processing. Note that the processing shown in FIG. 12B is merely an example, and the order is not limited.

Steps S1200*b* and S1201*b* are the same as steps S800*a* and S801*a* in FIG. 8A, and a description thereof will be omitted. Note that in step S1200*b*, the control unit 101 may select an XML file in accordance with a selection command received from the controller 300.

In step S1202*b*, the control unit 101 determines whether a recording start command is received from the controller 300 via a network I/F 105. Upon determining that the recording start command is received, the control unit 101 advances the process to step S1203*b*. Upon determining that the recording start command is not received, the control unit 101 returns the process to step S1202*b*. That is, the control unit 101 repeats the processing of step S1202*b* until the recording start command is received.

In steps S1203*b* to S1207*b*, the control unit 101 performs the same processing as in steps S803*a* to S807*a* of FIG. 8A. Hence, a description of steps S1203*b* to S1207*b* will be omitted.

In step S1208*b*, the control unit 101 determines whether a recording end command is received from the controller 300 via the network I/F 105. Upon determining that the recording end command is received, the control unit 101 advances the process to step S1209*b*. Upon determining that the recording end command is not received, the control unit 101 returns the process to S1208*b*. That is, the control unit 101 repeats the processing of step S1208*b* until the recording end command is received, and continues recording of the moving image data.

In steps S1209*b* to S1213*b*, the control unit 101 performs the same operations as in steps S809*a* to S813*a* of FIG. 8A.

As described above, the user can transmit the moving image data recording start and end instructions to the digital video camera 100 in a remote site by operating the controller 300 and obtain the same effect as in the first embodiment, that is, cause the digital video camera 100 to record a moving image file and an XML file in which metadata from the start to the end of recording associated with the moving image of the moving image file is stored.

According to the present invention, it is possible to cause an apparatus to record moving image data and metadata from the start to the end of the moving image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus including a communication unit and configured to transmit, via the communication unit, moving image data obtained by image capturing to an external apparatus configured to record the moving image data, comprising:

at least one processor and/or circuit; and at least one memory storing computer program, which causes the at least one processor and/or circuit to function as following units:

a moving image transmission unit configured to transmit, upon receiving an instruction to start recording, the moving image data obtained by image capturing by an image capturing unit to the external apparatus via the communication unit, and end, upon receiving an instruction to end the recording, the transmission of the moving image data to the external apparatus;

a metadata generation unit configured to generate, upon receiving the instruction to start the recording, metadata associated with the start of the recording of the moving image data, and generate, upon receiving the instruction to end the recording, metadata associated with the end of the recording of the moving image data; and a metadata transmission unit configured to transmit, upon receiving the instruction to end the recording, metadata from the start of the recording to the end of the recording to the external apparatus via the communication unit.

2. The image capturing apparatus according to claim 1, wherein the instruction to start the recording and the instruction to end the recording are received from an external control apparatus via the communication unit.

3. The image capturing apparatus according to claim 1, wherein upon receiving the instruction to start the recording, the moving image transmission unit transmits a recording start command to the external apparatus in addition to the moving image data, and upon receiving the instruction to end the recording, the moving image transmission unit transmits a recording end command to the external apparatus, and upon receiving the instruction to end the recording, the metadata generation unit receives, from the external apparatus, a file name of the moving image data recorded by the external apparatus and generates metadata including the received file name.

4. The image capturing apparatus according to claim 1, wherein the metadata generation unit generates metadata including a recording time from the reception of the instruction to start the recording to the reception of the instruction to end the recording.

5. A control method of an image capturing apparatus including a communication unit and configured to transmit, via the communication unit, moving image data obtained by image capturing to an external apparatus configured to record the moving image data, comprising:

transmitting, upon receiving an instruction to start recording, the moving image data obtained by image capturing by an image capturing unit to the external apparatus via the communication unit, and ending, upon receiving an instruction to end the recording, the transmission of the moving image data to the external apparatus;

generating, upon receiving the instruction to start the recording, metadata associated with the start of the recording of the moving image data, and generating, upon receiving the instruction to end the recording, metadata associated with the end of the recording of the moving image data; and transmitting, upon receiving the instruction to end the recording, metadata from the start of the recording to the end of the recording to the external apparatus via the communication unit.

6. A non-transitory computer-readable recording medium on which is recorded a program for causing a computer to execute the method according to 5.

7. A system comprising an image capturing apparatus connected to a network, and a recording apparatus, wherein the image capturing apparatus comprises:

at least one processor and/or circuit; and at least one memory storing computer program, which causes the at least one processor and/or circuit of the image capturing apparatus to function as following units:

a moving image transmission unit configured to transmit, upon receiving an instruction to start recording, the moving image data obtained by image capturing by image capturing means to the external apparatus, and end, upon receiving an instruction to end the recording, the transmission of the moving image data to the external apparatus;

a metadata generation unit configured to generate, upon receiving the instruction to start the recording, metadata associated with the start of the recording of the moving image data, and generate, upon receiving the instruction to end the recording, metadata associated with the end of the recording of the moving image data; and a metadata transmission unit configured to transmit, upon receiving the instruction to end the recording, metadata from the start of the recording to the end of the recording to the external apparatus, and the recording apparatus comprises:

at least one processor and/or circuit; and at least one memory storing computer program, which causes the at least one processor and/or circuit of the recording apparatus to function as following units:

a first recording unit configured to record the moving image data received from the image capturing apparatus as a moving image file in a recording medium; and a second recording unit configured to record the metadata received from the image capturing apparatus as a metadata file associated with the recorded moving image file.

8. The system according to claim 7, further comprising:

a control apparatus configured to control the image capturing apparatus from a remote site, wherein the image capturing apparatus receives the instruction to start the recording and the instruction to end the recording from the control apparatus.

* * * * *